United States Patent [19]

Meese et al.

[11] Patent Number: 4,532,418

[45] Date of Patent: Jul. 30, 1985

[54] MICROPROCESSOR ELECTRIC VEHICLE CHARGING AND PARKING METER SYSTEM STRUCTURE AND METHOD

[75] Inventors: William G. Meese, Bloomfield Hills; Robert G. Pratt, Farmington Hills; Mitchell D. Charneski, Southfield; Robert E. Brokenshire, Troy; Bruce F. Whitney, South Lyon, all of Mich.

[73] Assignee: The Detroit Edison Company, Detroit, Mich.

[21] Appl. No.: 684,160

[22] Filed: Dec. 21, 1984

Related U.S. Application Data

[63] Continuation of Ser. No. 413,089, Aug. 30, 1982, abandoned, which is a continuation of Ser. No. 194,044, Oct. 6, 1980, abandoned.

[51] Int. Cl.³ .................. B65G 11/00; G06F 7/08
[52] U.S. Cl. .................. 235/381; 194/11; 320/2
[58] Field of Search ............ 346/14 MR; 320/2, 44, 320/48; 324/113; 364/464; 235/381; 194/11, DIG. 22, 1 M, 1 N, 6

[56] References Cited

U.S. PATENT DOCUMENTS

| | | | |
|---|---|---|---|
| 3,495,694 | 2/1970 | Roach, Jr. | 194/DIG. 22 |
| 3,986,114 | 10/1976 | Hare | 194/11 |
| 4,052,655 | 10/1977 | Vizza | 320/2 |
| 4,085,313 | 4/1978 | Van Ness | 235/381 |
| 4,170,752 | 10/1979 | Busch et al. | 194/11 |
| 4,184,580 | 1/1980 | Ellis, Jr. | 320/2 |
| 4,228,519 | 10/1980 | Pfeifer | 194/DIG. 22 |
| 4,240,030 | 12/1980 | Bateman et al. | 346/14 MR |
| 4,291,375 | 9/1981 | Wolf | 364/464 |
| 4,383,210 | 5/1983 | Wilkinson | 194/11 |

FOREIGN PATENT DOCUMENTS

| | | | |
|---|---|---|---|
| 2659817 | 3/1978 | Fed. Rep. of Germany | 320/2 |
| 2273392 | 12/1975 | France | 194/11 |

*Primary Examiner*—Donald J. Yusko
*Attorney, Agent, or Firm*—Barnes, Kisselle, Raisch, Choate, Whittemore & Hulbert

[57] ABSTRACT

Structure for and method of charging an electric vehicle at a parking location and facilitating billing for the charging energy utilized and the parking time. The structure includes a charging and parking meter at a parking space for receiving a charge card and into which a charging plug from an electric vehicle may be placed, structure for reading the charge card placed in the meter and for locking the plug in place, and a central processor unit for determining the charging energy used and parking time and for storing billing data relative thereto at a remote location, for periodic removal to facilitate billing. The method of the invention includes the steps of permitting charging of an electric vehicle at a parking location in response to use of a charge card and storing charging and parking information for subsequent retrieval to facilitate billing to the owner of the charge card.

12 Claims, 4 Drawing Figures

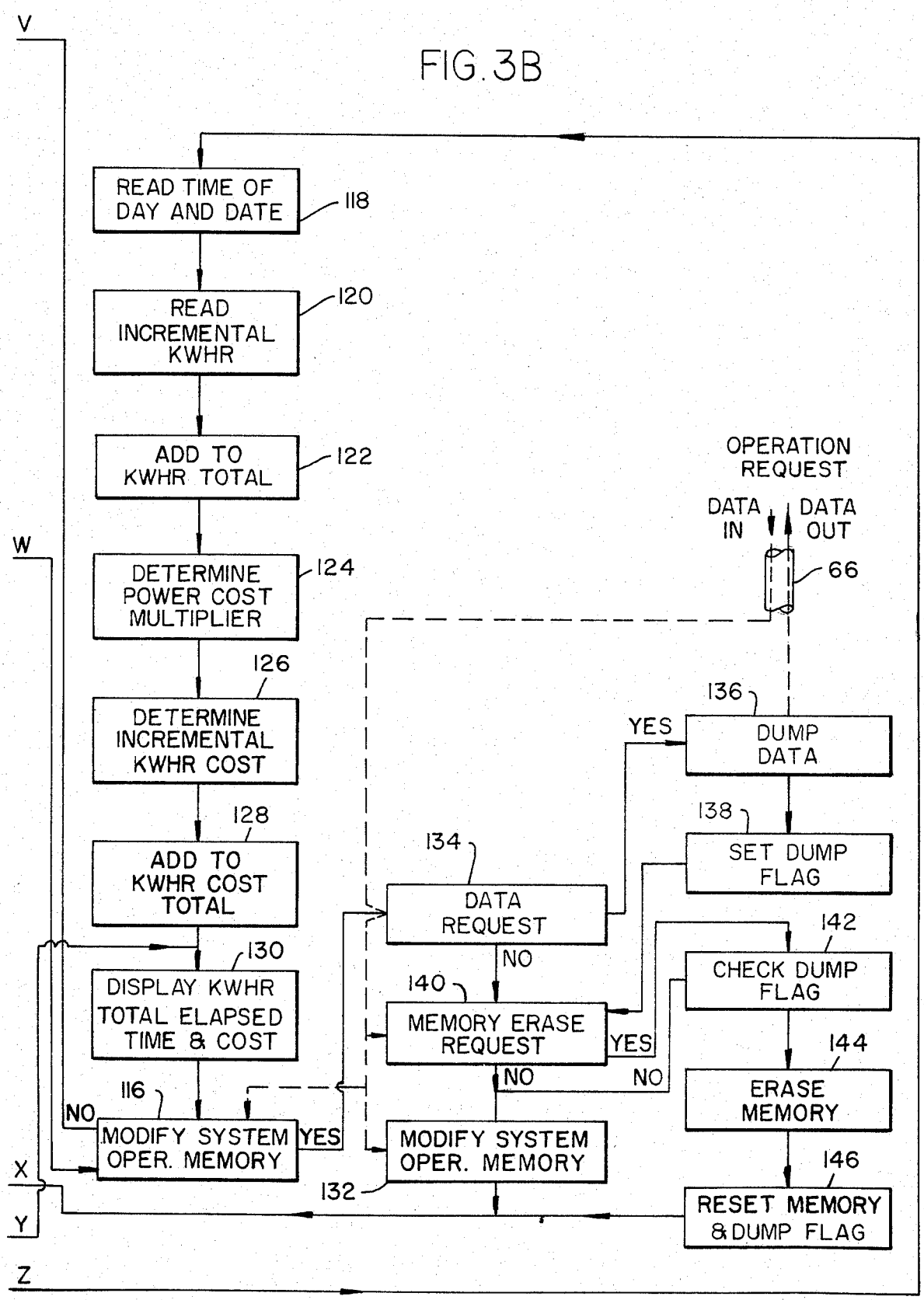

MICROPROCESSOR ELECTRIC VEHICLE CHARGING AND PARKING METER SYSTEM STRUCTURE AND METHOD

This is a continuation of copending application Ser. No. 413,089 filed on Aug. 30, 1982 and abandoned, which is a continuation of application Ser. No. 194,044, filed Oct. 6, 1980, and abandoned.

BACKGROUND OF THE INVENTION

1. Field of the Invention

The invention relates to electric vehicles and refers more specifically to structure for and a method of charging an electric vehicle at a parking location is response to use of a charge card and facilitating subsequent billing of the owner of the charge card for the energy used in charging the vehicle and the time the vehicle is parked at the parking location.

2. Description of the Prior Art

With the current state of the electric vehicle art, the range of electric vehicles between charging is limited. Thus, periodic charging of current state of the art electric vehicles is a necessity. Such charging usually takes place over extended periods of time as compared with the time required to place conventional fuel in an automobile operating with an internal combustion engine. It is envisioned that such charging will not always be convenient at the home location of an electric vehicle and that other charging locations would be desirable to increase the range of electric vehicles.

It would be desirable if billing for the charging of the electric automobiles at a remote location could be done directly without the use of cash, as is currently necessary with parking meters.

SUMMARY OF THE INVENTION

In accordance with the present invention, structure for and a method of charging an electric vehicle at a parking location and facilitating billing for the electric energy used to charge the vehicle and for the parking space directly is provided.

The structure of the invention includes a charging and parking meter at a parking location which may be operated by a charge card or the like to permit charging of an electric automobile. The structure of the invention also includes a microprocessor for temporarily storing parking time and energy use data, and means for reading out of the microprocessor the parking and energy use data periodically to facilitate billing.

The method of the invention includes the steps of connecting an electric vehicle in a parking location to a charging and parking meter, initiating starting and stopping of charging of the vehicle in the parking location, temporarily storing parking and energy use data, and subsequently retrieving such data for central billing purposes.

BRIEF DESCRIPTION OF THE DRAWINGS

FIGS. 3A and 3B are together a functional block diagram of the microprocessor electric vehicle charging and parking meter system of the invention. FIGS. 3A and 3B are connected at V, W, X, Y and Z to complete a single functional block diagram.

DESCRIPTION OF THE PREFERRED EMBODIMENT

Figure 1:
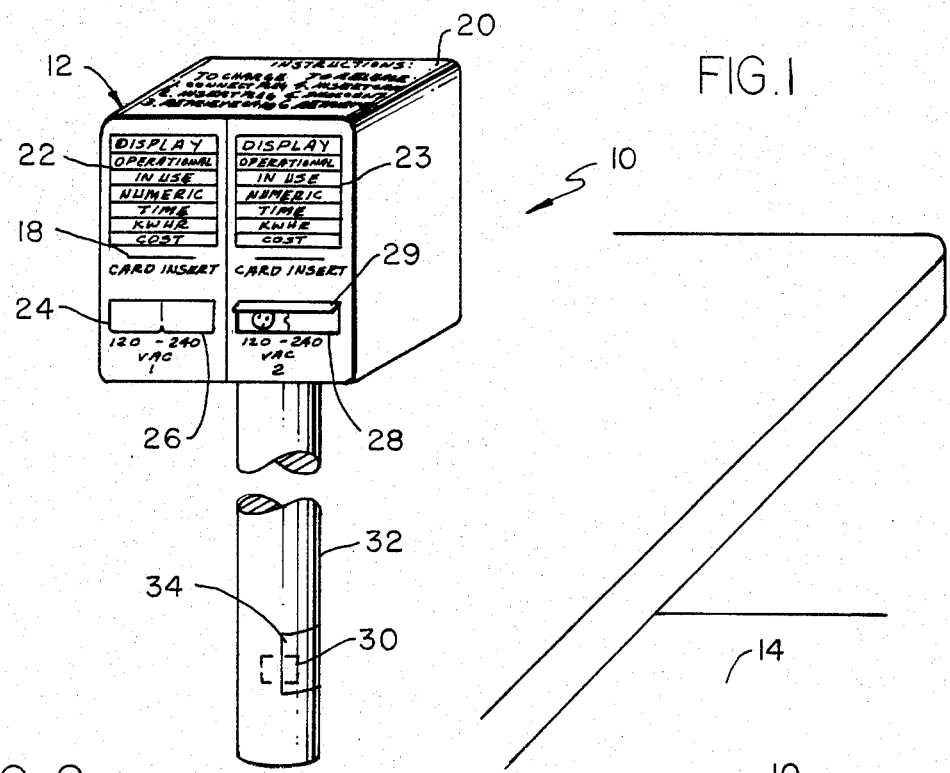
FIG. 1 is a diagrammatic representation of the charging and parking meter portion of the microprocessor electric vehicle charging and parking meter system structure and method of the invention.

The electric vehicle charging and parking meter system structure 10 of the invention includes a meter 12 positioned adjacent a parking space 14 and a microprocessor unit 16 connected to the meter 12 for computing and storing time, electrical energy use and cost data for vehicles parked in the parking space 14. The microprocessor unit 16 including a central processor unit 60, a read-only memory 62 and a random access memory 64 and interface circuitry, permits periodic withdrawal of the time, kilowatt hour and cost data therefrom for central billing to the owner of a charge card used to actuate the microprocessor unit 16 through the meter 12.

The microprocessor electric car charging and parking meter system structure 10 will provide future electric vehicle owners an exclusive space with a source of electric energy for charging the batteries of electric vehicles while the drivers of the vehicles are at work, shopping, at the theater, dining, at play, etc.

In accordance with the invention, charging is facilitated by inserting a charge card into the meter 12, through slot 18, and connecting the electric vehicle's charging cord plug to the meter 12.

Service charges for parking and charging the batteries of the vehicle are billed to a customer's account. The charge card may be obtained through a local power company or from the operator of a parking facility such as shopping malls and garages.

The meter 12 of the invention may be utilized for one or more parking spaces, as for example, two as shown in FIG 1. The meter 12 includes instructions for operation 20, an operational display window 22 through which operational indications such as "in use", "out of order", "violation", "rejection" and "improper charge card" may be read along with a numeric display 23 of time, kilowatt hour and cost resulting from energy use and parking.

Dual voltage sources, for example, 120 and 240 volt A.C. outlets 24 and 26, respectively, are also provided at the meter 12. The voltage sources 24 and 26 are provided with a sliding cover 28 so that only one will be available at any one time, and are further provided with a separate spring loaded cover 29 to protect the voltage sources when not in use.

In addition, a ground fault interrupter breaker 30 is provided in the meter post 32 with access through the post door 34.

Figure 2:
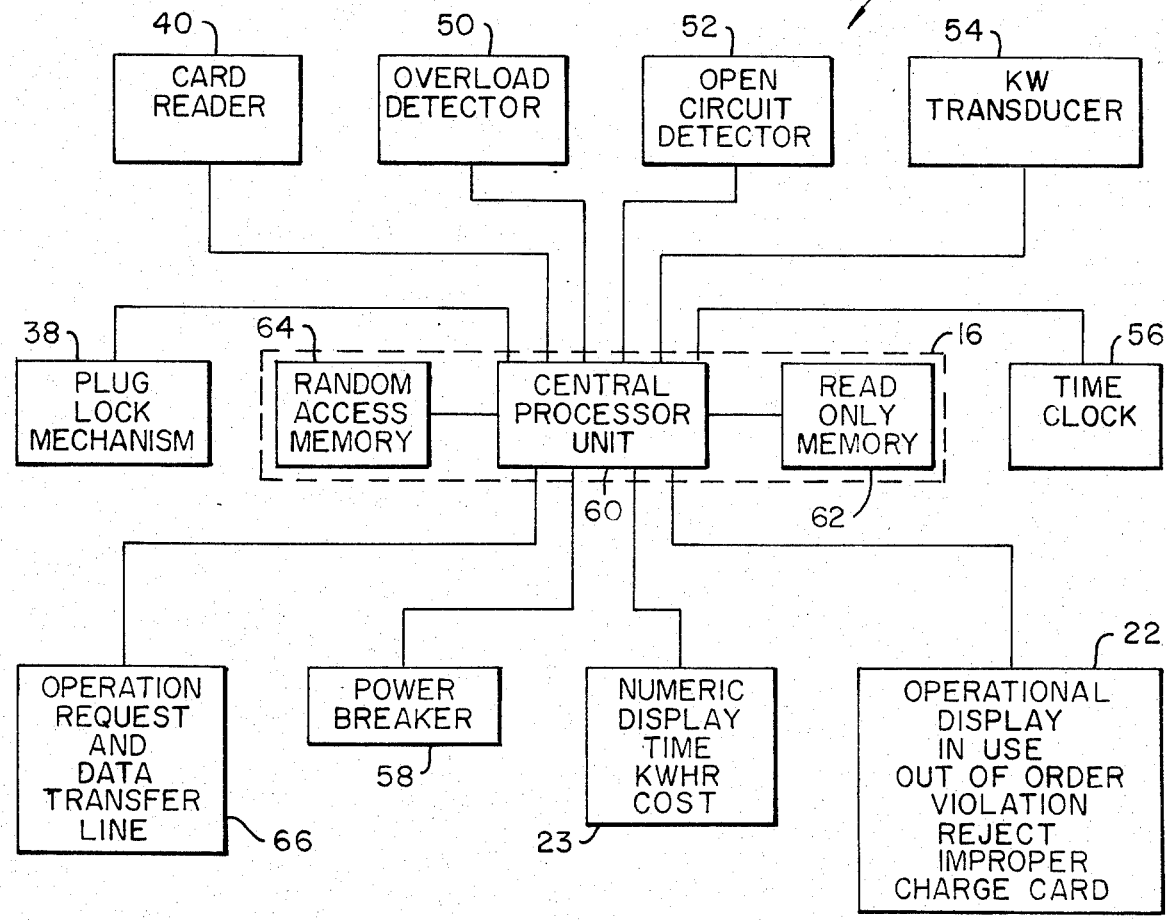
FIG. 2 is a block diagram of the principal components of the charging and parking meter system structure of the invention for practicing the method of the invention.

The meter structure illustrated 12 in FIG. 1 which includes the separate operational display structure 22 and numeric display structure 23, also includes the plug lock mechanism 38 and card reader 40, shown in FIG. 2. The plug lock mechanism 38 is operable on the first insertion of a charge card to lock a vehicle's electric charging cord plug to the meter structure 12 and to release the plug from the meter structure 12 on the second insertion of a charge card in the meter 10. The card reader 40 functions to identify the presence of a card in the meter 10 and to validate the card in accordance with identification parameters on the card.

The electric vehicle charging and parking meter system structure 10 includes an overload detector 50 for sensing charging circuit overloads, an open circuit detector 52 for sensing an open charging circuit, a kilowatt transducer 54 for determining energy used in charging of the electric vehicle, and a time clock 56 for aiding in the determination of the energy used in charging the vehicle, and in determination of the time of parking the vehicle. A power breaker 58 is provided for connecting and disconnecting the power to the electric vehicle being charged. The breaker 58 is activated or deactivated by customer request or a system fault.

The cooperation of the above described elements of the electric vehicle charging and parking meter system structure is under the control of a central processor unit 60 which utilizes both a read-only memory 62 which includes the operating programs for the central processor unit 60 and a random access memory 64 which contains storage cells for retaining individual customer billing data.

The changing and parking meter system structure 10 further includes the operation request and data transfer structure 66 which is connected to the central processing unit for providing a means of input to the central processing unit to charge the systems operating parameters such as times for and amounts of customer billing for services rendered, and operational requests such as dumping stored data and outputting customer billing data on request.

The method of operation of the microprocessor electric car charging and parking meter system structure 10 in accordance with the invention includes the placing of a series of charging and parking meter structures 12 at a location along a street or a parking facility and supplying alternating current, as for example, 120 or 240 volt A.C., thereto. Electric vehicles utilizing the microprocessor electric car charging and parking meter system structure 10 would have on-board chargers for converting the alternating current energy available at the meter structures 12 to direct current and for controlling the state of charge of the vehicle batteries.

A series of charging and parking meters 12 would be connected to a single microprocessor unit 16, which unit could be contained in one of the charging and parking meter enclosures to serve more than one charging and parking meter, or could be located in a nearby protected area to serve a group of charging and parking meters.

A microprocessor unit 16, which would include the central processor unit 60, the read-only memory 62, and random access memory 64 and interface circuitry, would receive various information from charge cards fed to the microprocessor electric vehicle charging and parking meter system structure 10 for identification and storage. The stored information would later be retrieved by a retrieving unit, not shown, to facilitate billing by a remote billing system in accordance with the method of the invention, or alternatively, in a separate embodiment, the information may be sent directly to a remote computer terminal for billing purposes.

The charging and parking meters 12 may be made to service, one, two or more electric automobiles. The charging and parking meters would function as a means of charging electric batteries when the owners are away from their residence. It is therefore hypothesized that the charging and parking meters would be located at shopping centers, indoor and outdoor theaters, parking garages, on-street and off-street parking spaces, or any other location where an electric vehicle owner may park for an extended time. Thus, the range of an electric vehicle can be extended considerably.

In use of the microprocessor electric vehicle charging and parking meter system structure 10 of the invention in accordance with the method of the invention, when a charge card is inserted in the slot 18 in the meter 12 shown in FIG. 1, the customer account number from the card is read by card reader 40, is validated by the central processor unit and is stored in the random access memory 64. The operation of the microprocessor electric vehicle charging and parking meter system structure 10 is thus started by a charge card and includes time and energy measurement. At this time, the "violation" indicator of the operational display 22 is defeated and the operational display 22 will indicate "in use". Also the kilowatt transducer 54 and time clock 56 are reset.

At such time, charging energy is available at meter 12 if the card reader 40 has read a valid customer account number and no fault such as a ground fault, a short circuit, or an open circuit are indicated. The vehicle charging cord plug may then be inserted in a meter receptacle and the plug safety clamp may be actuated.

At the conclusion of a parking and/or charging period, as terminated, by reinserting the same charge card a second time into the slot 18, the total time and energy information will be temporarily stored by the microprocessor unit 16 in the random access memory.

On a routine basis, as for example, once a month, the microprocessor electric vehicle charging and parking meter system structure will be read to facilitate central billing from the information stored in the microprocessor unit. The reading of the microprocessor electric vehicle charging and parking meter system structure 10 may be by any one of a number of methods. Thus, in one embodiment of the invention, a meter reader will carry an electronic reader system instrument to the microprocessor electric vehicle charging and parking meter system structure 10, insert a plug from the reader system into the microprocessor electric vehicle charging and parking meter system structure 10 and through the operation request and data transfer line will activate a read process, and thereby transfer data stored in the random access memory to a tape in the reader system. Alternatively, the reader system instrument may be coupled to the microprocessor electric vehicle charging and parking meter system structure 10 unit 16 by electromagnetic radiation.

The reader system instrument can also be central computer unit which interrogates the microprocessor electric vehicle charging and parking meter system structure 10 over a communication link.

When desired energy and time data has been transferred from the random access memory 64 in the microprocessor unit 16, the random access memory 64 will be erased for subsequent use.

In accordance with the method of the invention, data collected from the microprocessor unit 16 may be fed into a central computer data bank in a central facility and all charges will be added to the appropriate customer bill. The charges would consist of both a fee for charging the vehicle based on electrical energy consumed and a fee for parking.

It is also within the scope of the invention to incorporate the microprocessor electric charging and parking meter system 10 into an electric service station capable of fast charging, that is, charging an electric vehicle batteries, in about one-half hour to an hour. The electric service station could also be a battery bank using batteries similar to those designed for utility load leveling.

With a fast charging system, because of the high load currents involved, the electric vehicle would of necessity be designed to accept the higher current. The connections and cable would be much larger than required for charging parking meters 12.

The service station could also have a battery exchange service in which a particular electric vehicle owner would have his battery pack exchanged for a fully charged battery pack. The service stations could be owned by an electric utility or could be leased to individuals. All billing could be through charge cards.

The microprocessor electric vehicle charging and parking meter system structure and method 10 of the invention has many advantages for public utilities, electrical vehicle owners, and parking meter owners.

Advantages for the utilities would be the opportunity to build load and expand into a new growth area. The rate structure could be easily varied by means of the operation request and data transfer line 66. Direct customer billing, billing based on energy usage and duration of parking, and a billing rate that could be varied according to time of day would also be possible.

For the electric vehicle owner, the useful range of the electric vehicle would be extended. The charging of the electric vehicle would be simplified and there would be cashless transactions at time of use.

For the parking facility operator, charges might be billed to existing accounts of department stores, and the charging and parking systems could attract customers to a shopping area.

Figure 3A:
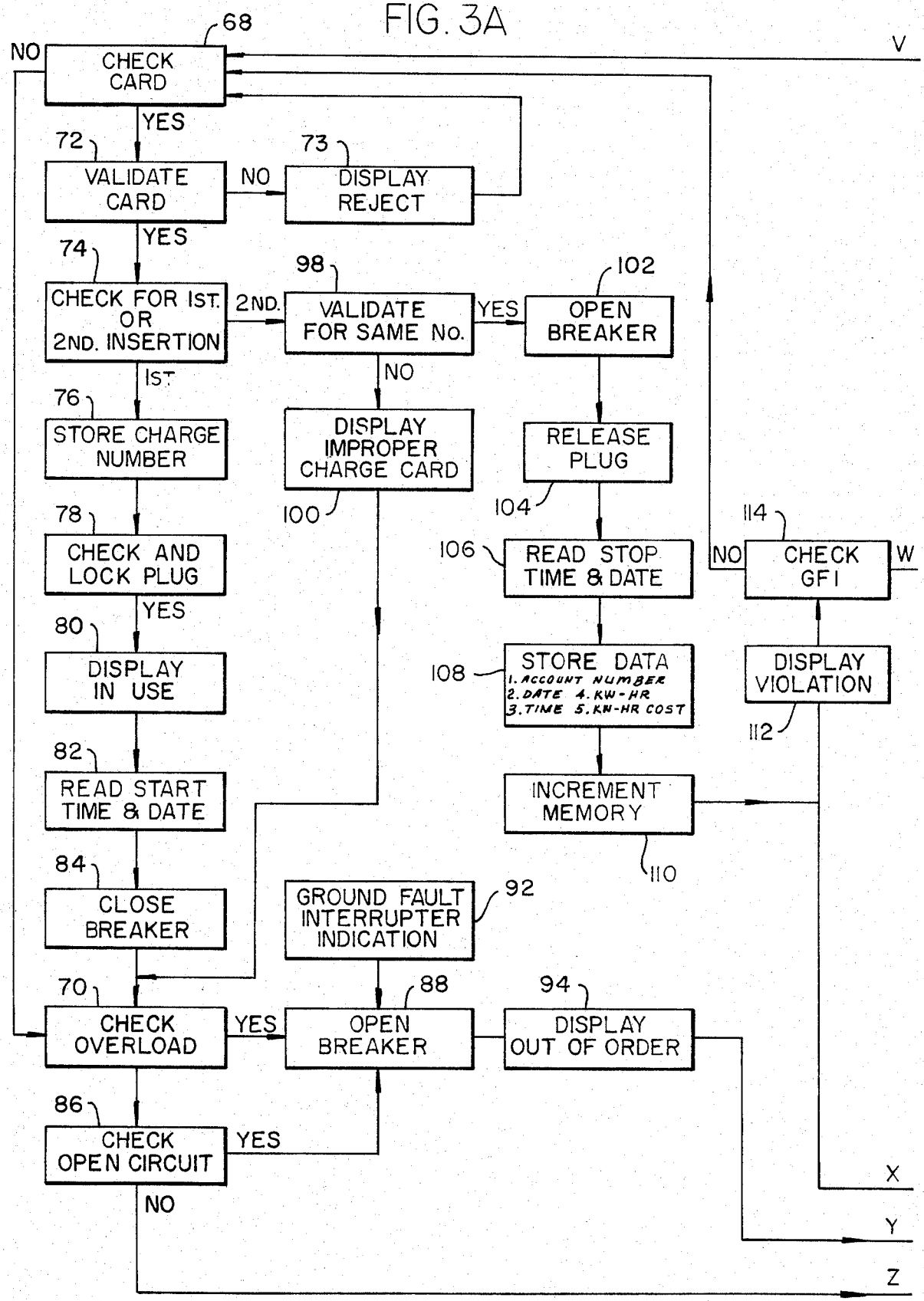

More specifically referring to FIGS. 3A and 3B, the detailed function and method of operation of the microprocessor electric vehicle charging and parking meter system 10 of the invention will be considered.

First, a card check function is initiated as indicated by the card check function block 68 at the meter 12 to determine if a charge card has been inserted in the slot 18. Such checking is continuous in the operation of the structure 10.

If no card is sensed in the slot 18, an overload check is accomplished as indicated by check overload function block 70 to insure that the structure 10 is operating without overload.

If a card is sensed in the slot 18, a validate card function through central processor unit 60 is initiated as indicated by validate card function block 72. If the card in the slot 18 is not a valid charge card, the display in the operational display unit 22 will be caused to read "reject" as indicated by display reject function block 73 and card checking will be continued.

If the card sensed is a valid card, the system 10 will check through the central processor unit 60 to determine if this is the first insertion or the second insertion of the card in a parking period as indicated by the check for first or second insertion function block 74.

If it is the first insertion of a card in a parking period, the charge number of the card is stored in the random access memory unit 64 by the central processor unit 60 in accordance with function block 76.

At this time, the central processor unit 60 will instruct the plug lock mechanism 38 at meter 12 to lock the vehicle cord plug, which has been placed in one of the energy sources 24 and 26 in meter 12 prior to insertion of a charge card in slot 18, in place and will check to see if the plug is in place in accordance with function block 78.

The operational display 22 on the meter 12 will then be caused to provide an "in use" display in accordance with function block 80 by the central processor unit 60.

The central processor unit 60 will then read the start time and date for subsequent billing of charging energy and parking time from the time clock 56 and place the pertinent information in the random access memory 64 in accordance with the read start time and date function indicated by function block 82.

The power breaker 58 then closes under control of the central processor unit 60, allowing energy to flow to the vehicle to charge the vehicle as shown by function block 84.

The charging circuit is checked for overload and open circuit on closing of breaker 84 by the central processor unit 60 in accordance with the check overload function block 70 and the check open circuit function block 86.

If an overload or open circuit is found by the central processor unit 60, the central processor unit will cause the power breaker 58 to open, cutting off charging power to the vehicle in accordance with the open breaker function block 88.

Also, the power breaker 58 may be opened at any time by the ground fault interrupter 30 in accordance with the ground fault interrupter indication function block 92. On opening of the power breaker 58, an out-of-order operational display will be presented at the meter 10 in accordance with the display "out of order" function block 94.

Reverting now back to the check for first or second insertion function block 74, if it is found that the valid card inserted has been inserted for the second time during a parking period, the card is validated for the same number, that is, to insure that the same valid card has been inserted for the second time as indicated in the validate for same number function block 98 through the central processor unit 60.

If the card is not validated for the same number as the first card inserted in the same parking period, an improper charge card operational display will be presented on the meter 10 under control of the central processor unit 60 in accordance with the display improper charge card function block 100 as shown in FIG. 3A.

If the improper charge card display has been triggered by the central processor unit, the overload and open circuit functions and those functions which occur thereafter are rechecked to insure proper operation of the microprocessor vehicle charging and parking meter system 10.

Reverting back to the validate for same number function block 98, if the charge card inserted for the second time is validated as the same charge card previously inserted for the first time in the parking period, the power breaker 58 is opened in accordance with a signal from the central processor unit 60 as indicated by function block 102 in FIG. 3A.

The central processor unit 60 then causes the charging cord plug of the parked vehicle to be released as indicated by the release plug function block 104.

At this time, the central processor unit 60 initiates the reading of the stop time and date, again from the time clock 56 as indicated by function block 106.

The central processor unit 60 then stores the account number of the charge card, the date and the time of the charging and parking, the number of kilowatt hours of charging energy used, and the kilowatt hour cost in temporary storage in the random access memory 64 as indicated by the store data function block 108.

The random access memory 64 is then incremented to provide an empty memory unit for the next customer utilizing the parking space 14 under control of the meter 12, as indicated on the increment memory function block 110. At this time, the meter operation display will indicate violation since no vehicle connected to meter 12 is parked in the parking space 14 as indicated by the function block 112.

A check for ground fault, as indicated by the check ground fault function block 114, is then made. If no ground fault indication is present, the check for a charge card as indicated in the check card function block 68 will again be initiated, and will continue until a subsequent card is inserted in the meter slot 18 a first time to start a new parking period sequence.

If a ground fault is detected, a signal is provided by the central processor unit 60 in accordance with the modify system operation memory function block 116 to alter the system operation to prevent further utilization of the system 10 until the ground fault is corrected, or other appropriate action is taken.

The functions of blocks 82 and 106 are then correlated in the central processor unit as indicated by the read time of day and date function block 118, the incremental kilowatt hours are determined in the central processor unit 60 in accordance with the read incremental kilowatt hour function block 120, and the incremental kilowatt hour cost is added to the total kilowatt hours for a particular customer as indicated by the add to kilowatt hour total function block 122.

The power cost multiplier is taken from the read-only memory 62 by the central processor unit 60 as indicated by the determine power cost multiplier function block 124 and the incremental cost of the last usage of energy by a particular customer is determined in the central processor unit 60 as indicated by the determine incremental kilowatt hour cost function block 126.

The incremental kilowatt hour cost is then added to the total kilowatt hour cost as indicated by the function block 128 and the numeric display is caused to indicate time, kilowatt hour, and cost of the latest energy use and parking time charged on the meter 12 by function block 130.

If, in the checking of the overload and open circuit, an overloaded or open circuit is found to be present, or a ground fault is found to be present, the possibility is that the readings provided the central processor unit 60 will be inaccurate. Accordingly, the information received in the particular parking period will not be utilized to display total elapsed time and cost in accordance with function block 130, and an indication will be given that a fault has occurred in accordance with the modify system operation memory function block 116.

Periodically, as indicated above, the data stored in the random access memory 64 needs to be retrieved and placed in a central billing unit and the memory unit erased so that it can be utilized again. Also, it is periodically necessary to update the information in the central processor unit 60. That is, it is necessary to periodically modify the system operation memory.

As pointed out above, such operation may be accomplished by a small operation request and data transfer unit, taken to the microprocessor 16 servicing a number of meters 12, in which case the information fed to the central processor unit 60 and/or the information read therefrom may be accomplished by a hard wired line plugged into the operation request and data transfer line 66.

Alternatively, communication with the central processor unit 60 may be by way of electromagnetics.

The updating of the information in the central processor unit 60 and the retrieval of information therefrom may also be processed by a centrally located computer, which will in turn either process the customer's bills or transfer the information to a billing system.

As shown best in FIG. 3B, an operation request may be fed into the microprocessor unit 16 through the operation request and data transfer line 66. The operation request may modify the system operation memory as indicated by function block 116 and function block 132.

Alternatively, the operation request may be a request to dump the data in the random access memory as indicated by the function block 134. If data is requested as indicated in function block 134, the data may be dumped, again through the operation request and data transfer line 66 as indicated by the data dump function block 136 in FIG. 3B.

If a dump data request has been made and the data dumped in accordance with the function block 136, a signal will be presented indicating that it has been dumped as indicated by the set dump flag function block 138.

If a memory erase request has been received in accordance with function block 140, the dump flag function is checked in accordance with the check dump function block 142 to insure that the data has actually been dumped to a receiving mechanism prior to erasing the data in the memory. The memory is then erased as indicated by function block 144 and the memory flag is reset in accordance with the reset memory and dump flag function block 146.

If the dump flag 138 indicates that the data has not yet been dumped on receipt of a memory erase request, a signal is provided to the system operation memory in accordance with the function block 132 and the memory is not dumped.

Thus, it will be seen that the central processor unit 16 is the core of the microprocessor electric vehicle charging and parking meter system structure 10 and functions to control the operations of the plug lock 38, the card reader 40, overload detector 50, open circuit detector 52, kilowatt transducer 54, time clock 56, random access memory 64, readout memory 62, operation request and data transfer line 66, power breaker 58, numeric display 24, and operation display 22, in accordance with the function block diagram shown in FIGS. 3A and 3B.

The central processor unit 60 may be programmed and interrogated as desired through the operation request and data transfer line 66.

While one embodiment of the present invention has been disclosed in detail, it will be understood that other embodiments and modifications of the invention are contemplated. It is the intention to include all such embodiments and modifications of the invention as are defined by the appended claims.

We claim:

1. A charging meter for electric vehicles and like devices comprising
   an enclosure including means for mounting said enclosure adjacent to a vehicle parking location,
   a card reader within said enclosure with an opening for receiving an operator card from externally of said enclosure and for activating said meter as a function of indicia on a card inserted therein, plug means on said enclosure including an electrical receptacle for receiving the plug of a power cable coupled to a vehicle, and means for selectively and releasably locking the plug into said receptacle to prevent removal of the plug and cable during charging of the vehicle, and central processing and control means including first means coupled to said reader and responsive to insertion of an operator indicia-containing card into said reader for initiating a charging operation, second means responsive to said first means for activating said locking means so as to prevent removal of a plug from said receptacle during said charging operation, third means responsive to said first means for supplying electrical energy to said receptacle during said charging operation, fourth means for terminating a charging operation, and fifth means responsive to said fourth means for terminating supply of electrical energy to said receptacle and for releasing said locking means.

2. The meter set forth in claim 1 wherein said central processing and control means further comprises electrical meter means for registering cost information relative to electrical energy supplied to said receptacle during said charging operation, and memory means responsive to termination of said charging operation for storing said energy cost information.

3. The meter set forth in claim 2 wherein said central processing and control means includes means responsive to said card reader and to said electric meter means for storing said energy cost information in said memory means in separate segments associated with indicia on a card inserted into said card reader to initiate a charging operation.

4. The meter set forth in claim 3 wherein said central processing and control means further comprises a real time clock, parking meter means responsive to said first means and to said clock for registering cost information relative to parking time of a vehicle adjacent to said meter, and means for storing said parking cost information in said memory means in separate segments associated with indicia on a card inserted into said card reader.

5. The meter set forth in claim 4 wherein said fourth means for terminating said charging operation comprises means coupled to said card reader and responsive to second insertion of a card carrying the same indicia into said reader.

6. The meter set forth in claim 5 further comprising display means on said enclosure and responsive to said central processing and control means for indicating status thereof to an operator.

7. The meter set forth in claim 6 further comprising output means coupled to said memory means for selectively reading therefrom said energy and parking cost information in said separate segments associated with card indicia.

8. The meter set forth in claim 7 wherein said display means includes means coupled to said electric meter means and to said parking meter means for displaying said energy and parking cost information to an operator.

9. The meter set forth in claim 8 wherein said central processing and control means includes sixth means for selectively storing energy and parking rate information, and means coupling said sixth means to said electric and parking meter means for controlling operation of the latter as a function of rate information stored in said sixth means.

10. A charging meter for electric vehicles and like devices comprising an enclosure mounted on a pedestal adjacent to a vehicle parking location, a card reader within said enclosure with an opening for receiving an operator card from externally of said enclosure and for activating said meter as a function of readable indicia on a card so inserted, plug means on said enclosure including an electrical receptacle for receiving the plug of a power cable coupled to a vehicle, and means for selectively and releasably locking the plug into said receptacle to prevent removal of the cable during charging of the vehicle, and central processing and control means including first means coupled to said reader and responsive to first insertion of an operator card containing readable indicia into said reader for initiating a charging operation, second means responsive to said first means for activating said locking means so as to prevent removal of a plug from said receptacle during said charging operation, third means responsive to said first means for supply electrical energy to said receptacle during said charging operation, fourth means coupled to said card reader and responsive to second insertion of a card carrying the same said readable indicia into said reader for terminating said charging operation, and fifth means responsive to said fourth means for terminating supply of electrical energy to said receptacle and for releasing said locking means.

11. The meter set forth in claim 10 wherein said central processing and control means further includes electric meter means responsive to said third means and to said fifth means for calculating cost information associated with energy supplied to said receptacle during said charging operation, memory means, and means responsive to said fourth means for storing said energy cost information in said memory means following termination of said charging operation in separate memory segments associated with card indicia.

12. The meter set forth in claim 11 further comprising display means on said enclosure responsive to said electric meter means for displaying said cost information to an operator.

* * * * *